United States Patent
Block et al.

(10) Patent No.: US 10,138,620 B2
(45) Date of Patent: Nov. 27, 2018

(54) FAUCET ASSEMBLY INCLUDING A THERMOSTATIC MIXING CARTRIDGE

(71) Applicant: Zurn Industries, LLC, Milwaukee, WI (US)

(72) Inventors: Marc G. Block, Apex, NC (US); Michael A. Funari, Apex, NC (US)

(73) Assignee: Zurn Industries, LLC, Milwaukee, WI (US)

( * ) Notice: Subject to any disclaimer, the term of this patent is extended or adjusted under 35 U.S.C. 154(b) by 33 days.

(21) Appl. No.: 15/592,349

(22) Filed: May 11, 2017

(65) Prior Publication Data

US 2017/0342690 A1    Nov. 30, 2017

Related U.S. Application Data

(60) Provisional application No. 62/342,365, filed on May 27, 2016, provisional application No. 62/372,469, filed on Aug. 9, 2016.

(51) Int. Cl.

| | |
|---|---|
| *F16K 11/078* | (2006.01) |
| *E03C 1/04* | (2006.01) |
| *F16K 11/00* | (2006.01) |
| *G05D 23/13* | (2006.01) |
| *F16K 11/22* | (2006.01) |

(52) U.S. Cl.
CPC ............ *E03C 1/041* (2013.01); *E03C 1/0403* (2013.01); *F16K 11/22* (2013.01); *F16K 19/006* (2013.01); *G05D 23/134* (2013.01); *Y10T 137/86815* (2015.04)

(58) Field of Classification Search
CPC ........ F16K 11/22; F16K 19/006; E03C 1/041; E03C 1/0403; G05D 23/134
See application file for complete search history.

(56) References Cited

U.S. PATENT DOCUMENTS

| | | | |
|---|---|---|---|
| RE30,559 E * | 3/1981 | Schmitt ................... | F16K 11/22 137/315.12 |
| 4,458,839 A * | 7/1984 | MacDonald ....... | G05D 23/1353 137/625.4 |
| 5,931,181 A | 8/1999 | Cook et al. | |

(Continued)

OTHER PUBLICATIONS

Watts Water Technologies, Inc., "Powers New TempTAP™ ASSE 1070 Faucet Series with Integrated Thermostatic Valve", webpage: http://www.powerscontrols.com/pages/new_products/TempTAP.asp; copyright 2015, printed Oct. 27, 2015, 2 pages.

*Primary Examiner* — Umashankar Venkatesan
(74) *Attorney, Agent, or Firm* — Quarles & Brady LLP

(57) ABSTRACT

A faucet assembly including a faucet body having a spout, a base, and hot and cold water flow control valves. The base houses a thermostatic mixing cartridge that tempers hot and cold water and has passageways that place tempered water from the thermostatic mixing cartridge and a cold water passageway in selective fluid communication with the outlet of the spout. During use, mixed water from the thermostatic mixing cartridge is regulated by the hot water control valve, cold water is regulated by the cold water control valve, and both the mixed water and the cold water are further mixed at a juncture of the mixed water passageway and the cold water passageway prior to exiting the faucet assembly via the outlet of the spout.

15 Claims, 13 Drawing Sheets

(56) References Cited

U.S. PATENT DOCUMENTS

| | | | |
|---|---|---|---|
| 6,257,493 B1 * | 7/2001 | Chamot | E03C 1/041 |
| | | | 236/12.13 |
| 7,134,451 B1 | 11/2006 | Malapanes | |
| 7,648,078 B2 | 1/2010 | Kempf et al. | |
| 7,823,603 B2 | 11/2010 | Cochart et al. | |
| 8,020,779 B2 | 9/2011 | Jarvis | |
| 9,863,647 B1 * | 1/2018 | McNamara | F24D 17/0094 |
| 2011/0126919 A1 * | 6/2011 | Izzy | F16K 19/006 |
| | | | 137/468 |
| 2014/0251445 A1 * | 9/2014 | Guilbert | G05D 23/1306 |
| | | | 137/15.18 |
| 2014/0261781 A1 | 9/2014 | Dolgos | |
| 2017/0145670 A1 * | 5/2017 | Leinen | F16K 11/0787 |

* cited by examiner

FAUCET ASSEMBLY INCLUDING A THERMOSTATIC MIXING CARTRIDGE

CROSS-REFERENCE TO RELATED APPLICATION

This application claims priority to U.S. Provisional Application Nos. 62/342,365, filed May 27, 2016 and 62/372,469, filed Aug. 9, 2016, the contents of which are incorporated by reference for all purposes as if set forth in its entirety.

STATEMENT OF FEDERALLY SPONSORED RESEARCH OR DEVELOPMENT

Not applicable.

TECHNICAL FIELD

This disclosure relates to faucets and, more particularly, to faucets with an integrated thermostatic mixing cartridge.

BACKGROUND

Water from a water heater is often hotter than desirable for its end use at a plumbing fixture. For example, heating water to a high temperature (e.g., above 140° F.) can be important to avoid growth of bacteria during long-term storage of water at lukewarm temperatures (e.g., 105-115° F.) that may be more appropriate for end use. Further, although extremely hot water temperatures may be useful in some appliances in which the water does not directly interface with a person, such as a dishwasher, it is problematic for water at such high temperatures to directly contact the end user in other uses, such as faucets for washing.

Accordingly, many faucet and plumbing fixture setups utilize devices that control or regulate the temperature of the output flow of mixed water received from a hot and a cold input. One such temperature control device is a thermostatic mixing valve. A thermostatic mixing valve blends hot water with cold water to produce tempered hot water, conventionally prior to the introduction of the tempered hot water to the faucet or plumbing fixture in the first instance. Typically, the thermostatic mixing valve is plumbed to receive hot and cold water inputs and output tempered hot water for provision to the hot water connection of the faucet or other plumbing fixture. Separately, cold water is provided to the cold water inlet of the faucet. With this arrangement, even if the user sets the faucet or plumbing fixture to its hottest setting (e.g., opening the hot valve entirely while the cold valve remains closed), the use of the thermostatic mixing valve can limit the maximum output temperature of the faucet or plumbing fixture to that of the tempered hot water and ensure a constant, safe water temperature to prevent thermal shock or scalding of a user.

Unfortunately, to reduce the expense and time associated with installing a faucet or plumbing fixture, many installations lack a thermostatic mixing valve prior to the provision of water to the faucet. Further, some plumbing codes dictate when a thermostatic mixing valve must be used, which vary city to city and state to state.

SUMMARY

To help avoid situations in which an installer omits a thermostatic mixing valve, a faucet is proposed which incorporates and integrates a thermostatic mixing cartridge therein. Among other things, this prevents a thermostatic mixing valve from being omitted due to installer error or ignorance and can further simplify the installation process, because the faucet need only be hooked up to the hot and cold water lines and need not be split and re-routed into and out of the valve prior to entering the faucet.

This disclosure provides for a faucet assembly including a faucet body having a base and a spout with an outlet that is supported by the base. The base includes a cold water connection and a hot water connection adapted for the reception of cold and hot water supplies, respectively. The assembly further includes a hot water flow control valve and a cold water flow control valve each supported by the base of the faucet body and a thermostatic mixing cartridge disposed in the base. The thermostatic mixing cartridge has a hot water inlet that is in fluid communication with the hot water connection, a cold water inlet that is in fluid communication with the cold water connection, and a mixed water outlet. The base further includes a mixed water passageway having walls defined by the base which places the mixed water outlet of the thermostatic mixing cartridge in selective fluid communication with the outlet of the spout when the hot water flow control valve is opened. Still further, the base includes a cold water bypass passageway having walls defined by the base which places the cold water connection of the base in selective fluid communication with the outlet of the spout when the cold water flow control is opened. During use, a flow of mixed water from the thermostatic mixing cartridge is regulated by the hot water control valve into the spout, a flow of cold water is regulated by the cold water control valve, and the flows of both the mixed water and the cold water are further mixed at a juncture of the mixed water passageway and the cold water bypass passageway prior to exiting the faucet assembly via the outlet of the spout.

In some forms, the cold water bypass passageway that places the cold water connection of the base in selective fluid communication with the outlet of the spout when the cold water flow control valve is opened may provide a cold water flow pathway from the cold water connection to the outlet of the spout that does not flow through the thermostatic mixing cartridge.

In other forms, the faucet assembly may include a collar mounted between the base and the spout and the cold water bypass passageway and the mixed water passageway may be in fluid communication with an internal mixing chamber of the collar. The internal mixing chamber of the collar may also be located intermediate the cold water bypass passageway and the mixed water passageway and the outlet of the spout.

In still other forms, the collar may at least partially house the thermostatic mixing cartridge and a set of openings between the collar and the base may provide the mixed water outlet of the thermostatic mixing cartridge. The thermostatic mixing cartridge may also be adjustable to control an amount of hot and cold water entering the thermostatic mixing cartridge via the hot water inlet and the cold water inlet, respectively, and to establish a temperature of mixed water exiting the mixed water outlet.

In some forms, the thermostatic mixing cartridge may be rotationally adjustable to control an amount of hot and cold water entering the thermostatic mixing cartridge via the hot water inlet and the cold water inlet. The faucet assembly may also include walls at least partially surrounding the cartridge that are part of the base.

In some forms, the walls at least partially surrounding the cartridge that are part of the base may provide openings for the hot water inlet and the cold water inlet.

Additionally, in some forms, the faucet assembly may also further comprise a cartridge cap that is connected to a bottom of the base to retain the cartridge in place in which the retention cap includes an opening on an axial face thereof that permits adjustment of the cartridge.

In many forms, the thermostatic mixing cartridge (or at least part of the structure thereof) may be integral with or formed in the faucet body or walls thereof.

In some forms, the hot water inlet may be in fluid communication with the hot water connection via a hot water passageway having walls defined by the base and wherein a cold water inlet may be in fluid communication with the cold water connection via a cold water passageway having walls defined by the base.

In some forms, the thermostatic mixing cartridge may be centrally disposed between the hot water flow control valve and the cold water flow control valve. The cold water connection and the hot water connection may be tubular channels providing exterior threading for connection to cold and hot water supplies.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 1:
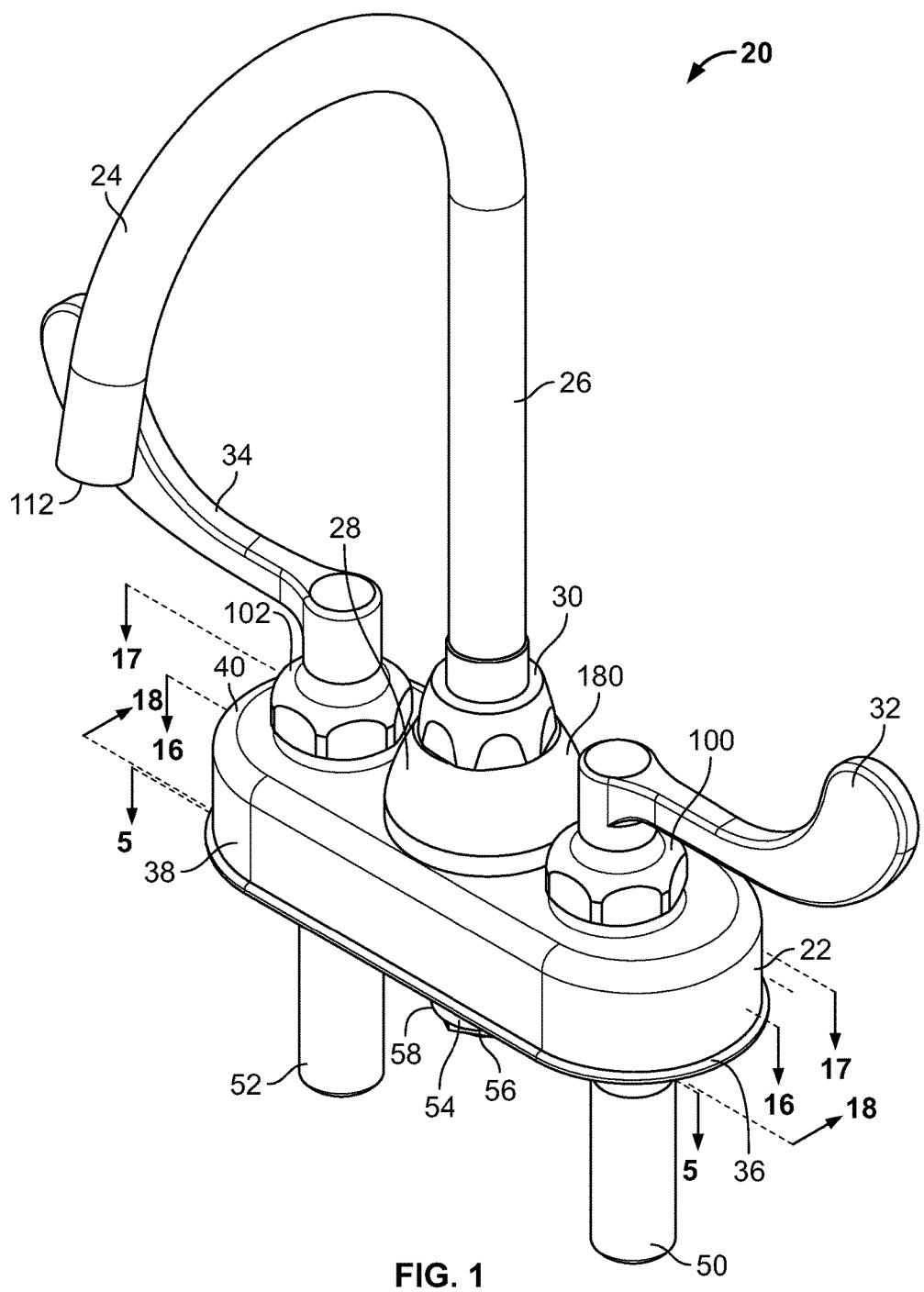
FIG. 1 is a top, front, right side view of a faucet assembly with spout head attached through a stem to a faucet base.

Before any embodiments of the invention are explained in detail, it is to be understood that the embodiments described are not limited in application to the details of construction and the arrangement of components set forth in the following description or illustrated in the following drawings. The described apparatus is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the apparatus described herein. Various modifications to the illustrated embodiments will be readily apparent to those skilled in the art, and the generic principles herein can be applied to other embodiments and applications without departing from the embodiments described herein below. Thus, embodiments of the described apparatus are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the described embodiments. Skilled artisans will recognize the examples provided herein have many useful alternatives and fall within the scope of the described embodiments.

Referring now to the drawings in which like reference numerals designate like or corresponding parts throughout the several views, FIG. 1 shows a preferred embodiment of a faucet assembly 20 including a body 22 and a spout 24 attached through a stem 26 to a collar 28 which is attached to the body 22. A collar nut 30 is provided adjacent the collar 28 to secure the collar 28 in place. In some embodiments, the collar nut 30 is threadably secured with the stem 26. FIG. 1 further shows a cold handle 32 and a hot handle 34, which individually control the flow of cold water and hot water into the faucet assembly 20, as will be described in greater detail hereinafter below. The collar 28 is disposed between the stem 26 and the body 22.

Still referring to FIG. 1, a gasket 36 is disposed along a bottom portion 38 of the body 22. The gasket 36 may be integrally formed with the body 22, or may be formed separately. The gasket 36 further may comprise the same material as the body 22, or may comprise a different material. A beveled or radiused edge defines a corner surrounding a top portion 40 of the body 22. The radiused edge may be rounded, beveled, or have any other configuration known to those of ordinary skill in the art. The body 22 is generally racetrack shaped when viewed from above; however, the body 22 may have any configuration known to those of ordinary skill in the art.

FIG. 1 shows a cold water shank 50 and a hot water shank 52. FIG. 1 also partially shows a cartridge cap 54 that is centrally disposed between the cold water shank 50 and the hot water shank 52 along the underside of the body 22. A security cap 56 is coupled with a bottom end 58 of the cartridge cap 54. When the cartridge cap 54 and the collar 28 are secured with the body 22, a thermostatic mixing chamber 60 (see FIG. 6) is formed within a portion of the body 22, as will be described and illustrated in greater detail below.

Figure 2:
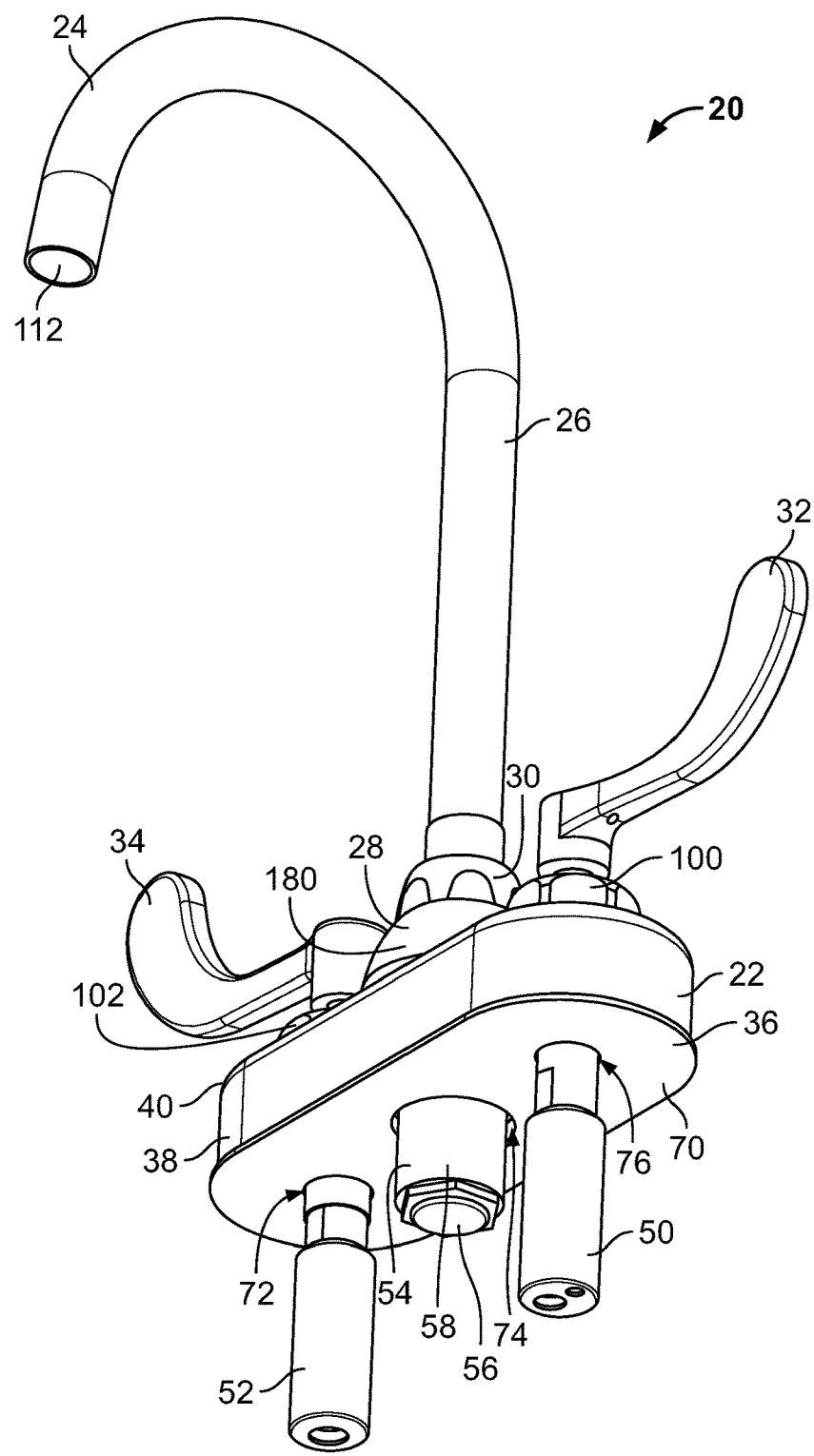
FIG. 2 is a bottom, front, right side view of the faucet assembly shown in FIG. 1.

Now referring to FIG. 2, a bottom surface 70 of the gasket 36 is shown, which forms a lower boundary of the faucet assembly 20. In a preferred embodiment, the bottom surface 70 includes a hot opening 72, a cartridge opening 74, and a cold opening 76. When the faucet assembly 20 is assembled, the hot water shank 52 is disposed within the hot opening 72, the cartridge cap 54 is coaxially situated with the cartridge opening 74, and the cold water shank 50 is disposed within the cold opening 76. After installation, the cold water shank 50 is in fluid communication with a cold water source (not shown) and the hot water shank 52 is in fluid communication with a hot water source (not shown) such that a cold water connection and a hot water connection are established with the faucet assembly 20.

Figure 3:
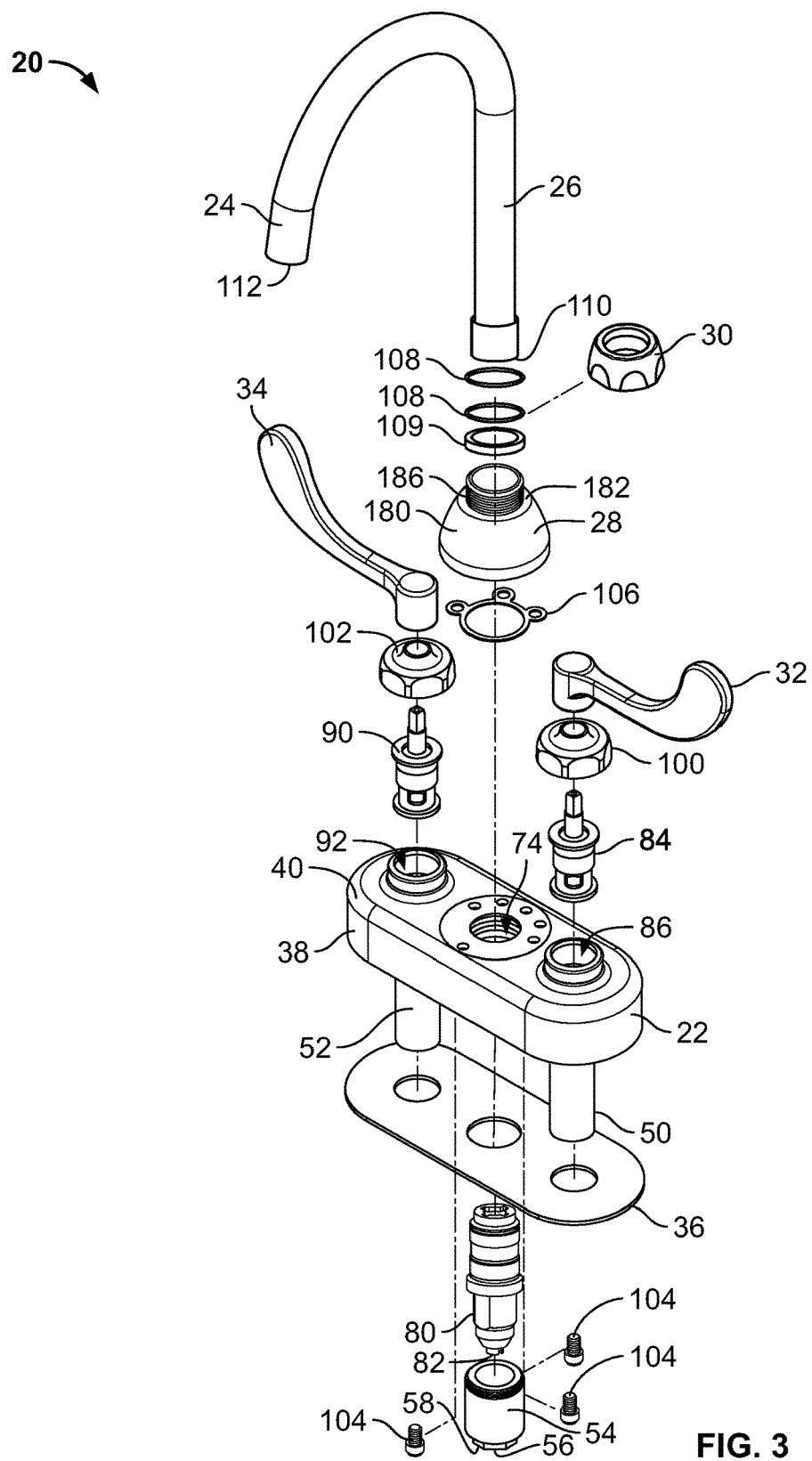
FIG. 3 is an exploded view of the faucet shown in FIG. 1.

FIG. 3 is an exploded view of the faucet assembly 20. The cartridge cap 54 is shown detached from the body 22. A thermostatic mixing cartridge 80 is shown between the cartridge cap 54 and the body 22. Also shown is an adjustment screw 82, which can be manipulated by a user to adjust the output temperature settings of a thermostatic mixing cartridge 80. The adjustment screw 82 allows a user to create a set point for the temperature of the mixed water, as will be described in greater detail hereinafter below. In some embodiments, the thermostatic mixing cartridge 80 is disposed coaxially with the cartridge cap 54, the cartridge opening 74, and the collar 28.

Figure 6:
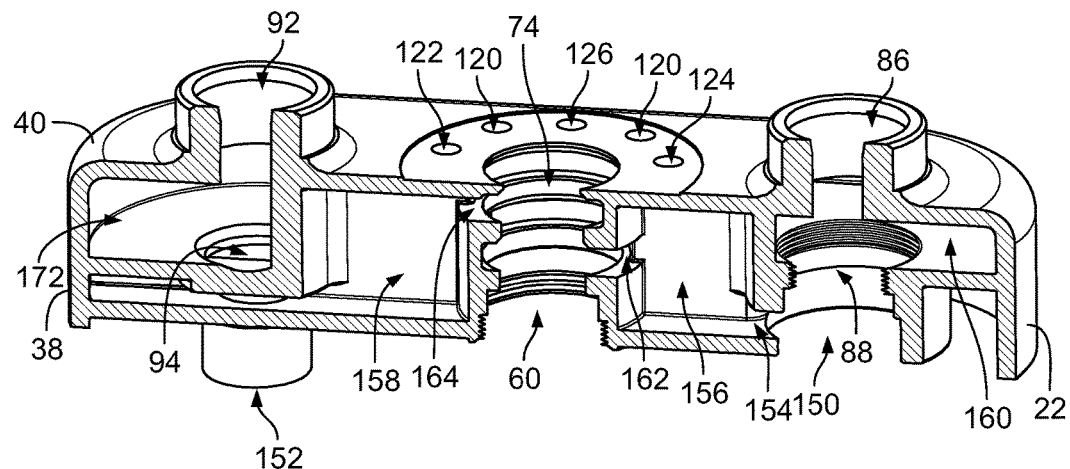
FIG. 6 is a front cross-sectional view taken through line 6-6 of the base shown in FIG. 4.
Figure 7:
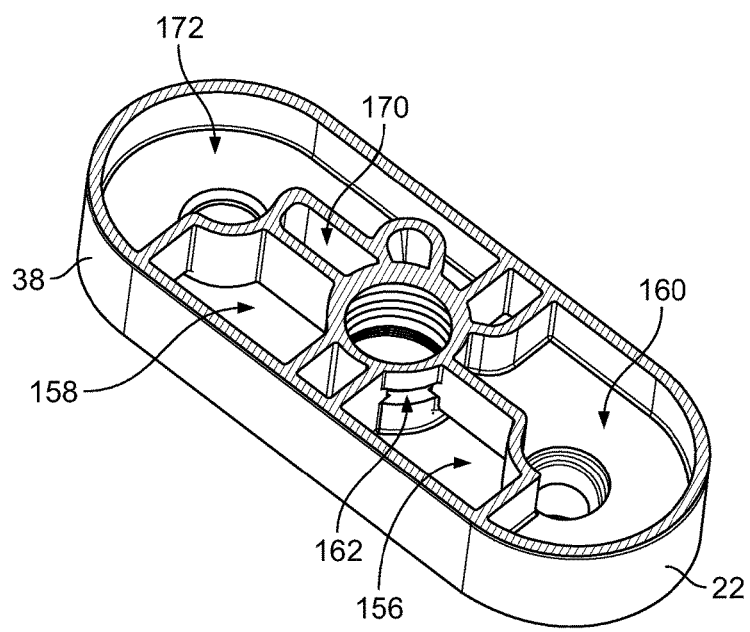
FIG. 7 is a top cross-sectional view taken through line 7-7 of the base shown in FIG. 4.
Figure 8:
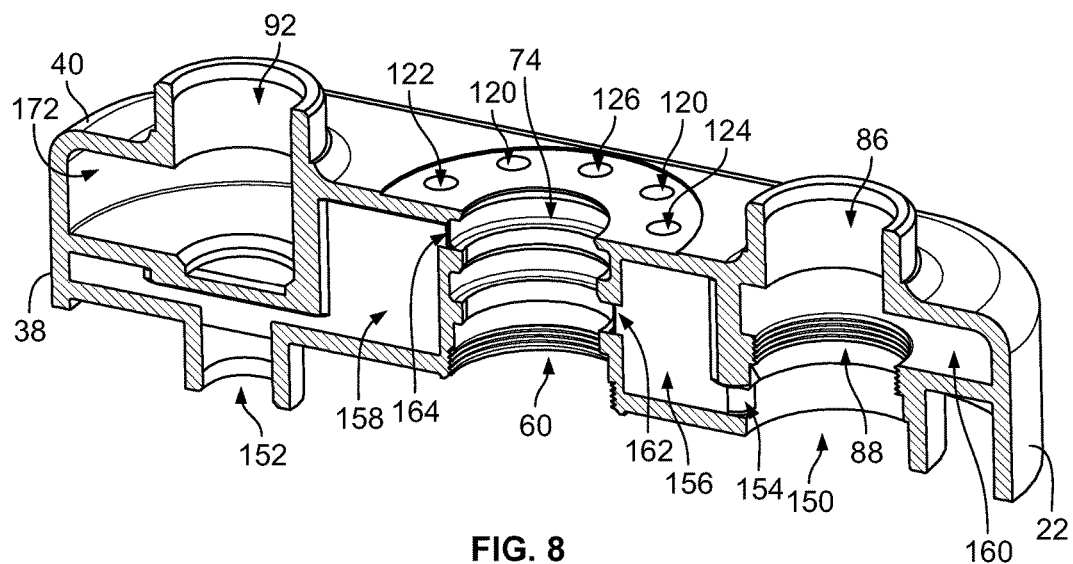
FIG. 8 is a front cross-sectional view taken through line 8-8 of the base shown in FIG. 4.
Figure 9:
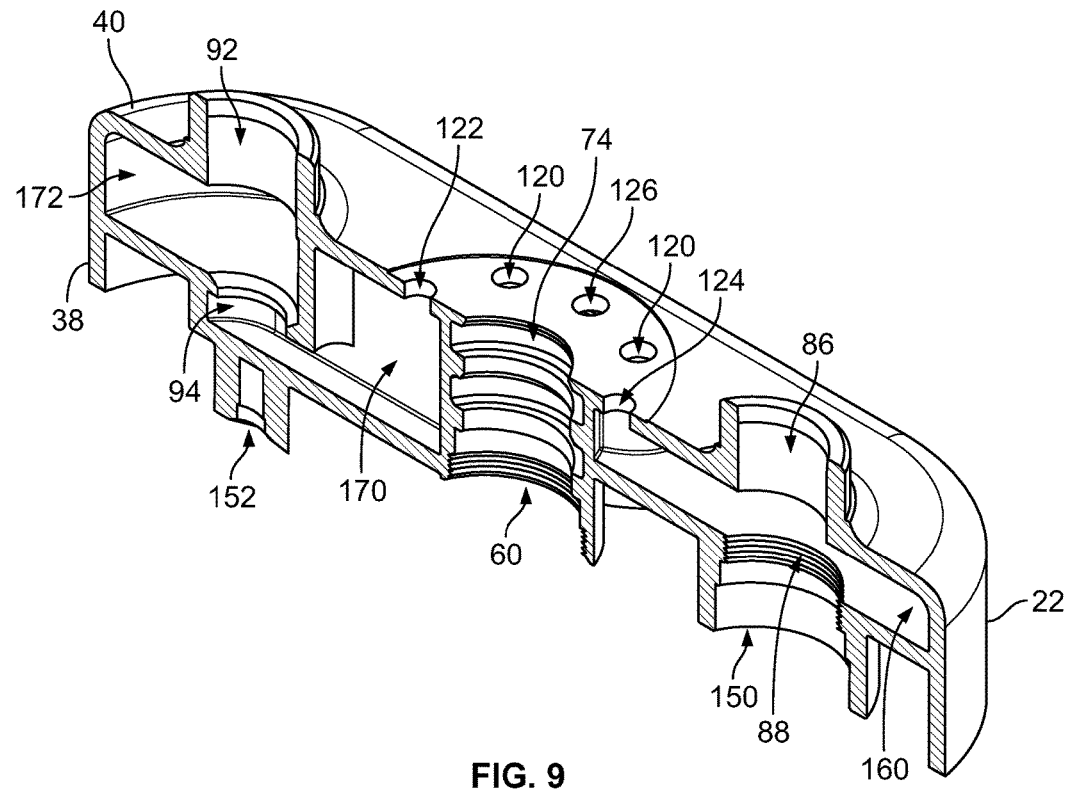
FIG. 9 is a front cross-sectional view taken through line 9-9 of the base shown in FIG. 4.
Figure 10:
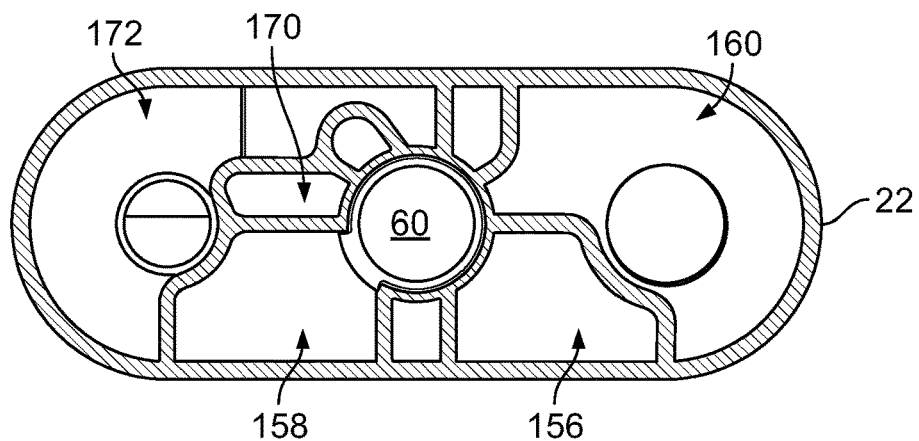
FIG. 10 is a top cross-sectional view taken through line 10-10 of the base shown in FIG. 4.
Figure 11:
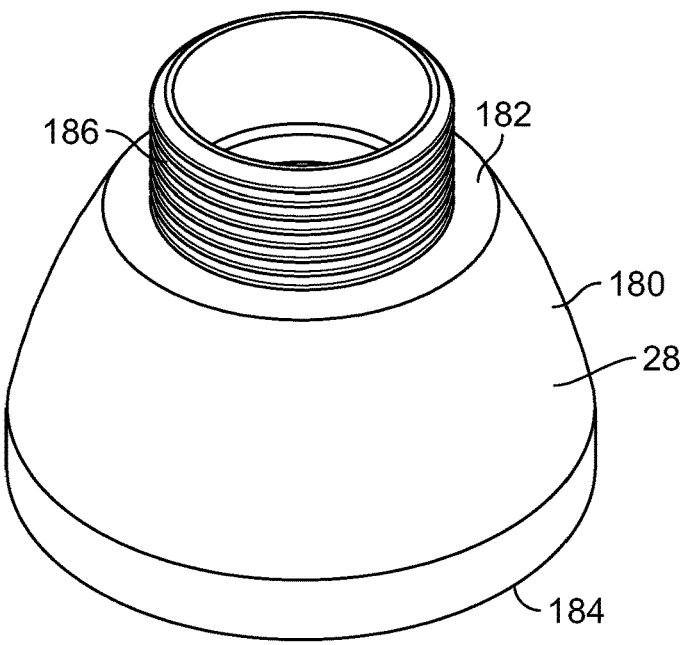
FIG. 11 is a view of a collar of the faucet assembly.

A cold water valve 84, representative of a cold water flow control valve, is shown. The cold water valve 84 is disposed coaxially with an upper cold water valve opening 86. A lower cold water valve opening 88 is shown in FIG. 6, which is disposed coaxially with the cold opening 76 in which the bottom of the cold water valve 84 is received. A hot water valve 90, representative of a hot water flow control valve, is shown disposed coaxially with an upper hot water valve opening 92. A lower hot water valve opening 94 is shown in FIG. 6, which is coaxial with the upper hot water valve opening 92.

Referring again to FIG. 3, a cold handle nut 100 is shown coaxially situated with the cold opening 76 and a hot handle nut 102 is shown coaxially situated with the hot opening 72. The cold handle nut 100 and the hot handle nut 102 are shown having a generally hexagonal shape, however the handle nuts 100, 102 may be formed in any shape, and may be circular, triangular, square, pentagonal, octagonal, or may have any other shape. These nuts 100 and 102 may be secured to the top of the body 22 to retain the valves 84 and 90 within the body 22, but permit a stem of the respective valves to extend therethrough for attachment to the handles 32 and 34. During use, a user rotates one or both of the cold handle 32 and the hot handle 34 in a clockwise or counter-clockwise direction, depending on the installation and valve orientation of the faucet assembly 20 to allow water to enter the faucet assembly 20 or to shut water off, and thereby prevent water from entering the faucet assembly 20. As shown in the exploded assembly of FIG. 3, upper portions of the cold water valve 84 and the hot water valve 90 extend through the cold handle nut 100 and the hot handle nut 102, respectively, and are received by the cold handle 32 and the hot handle 34, respectively, when the faucet assembly 20 is fully assembled.

Also shown in FIG. 3 are fasteners 104, which fasten the collar 28 to the body 22. The fasteners 104 may be screws, bolts, rivets, or any other fastener known to those of ordinary skill in the art. Further, a collar seal 106 is disposed between the body 22 and the collar 28 to provide a water tight seal between fluid passages of the body 22 and the collar 28, as will be described in greater detail hereinafter below. In the exploded view of FIG. 3, O-rings 108 and a washer 109 are shown that surround an entry end 110 of the stem 26 when fully assembled. The washer 109 may be included to prevent substantial rotation of the stem 26 after installation. The O-rings 108 generally prevent liquid from leaking or escaping the faucet assembly 20 when water is traveling from the collar 28 to an exit end 112 of the spout 24.

Figure 4:
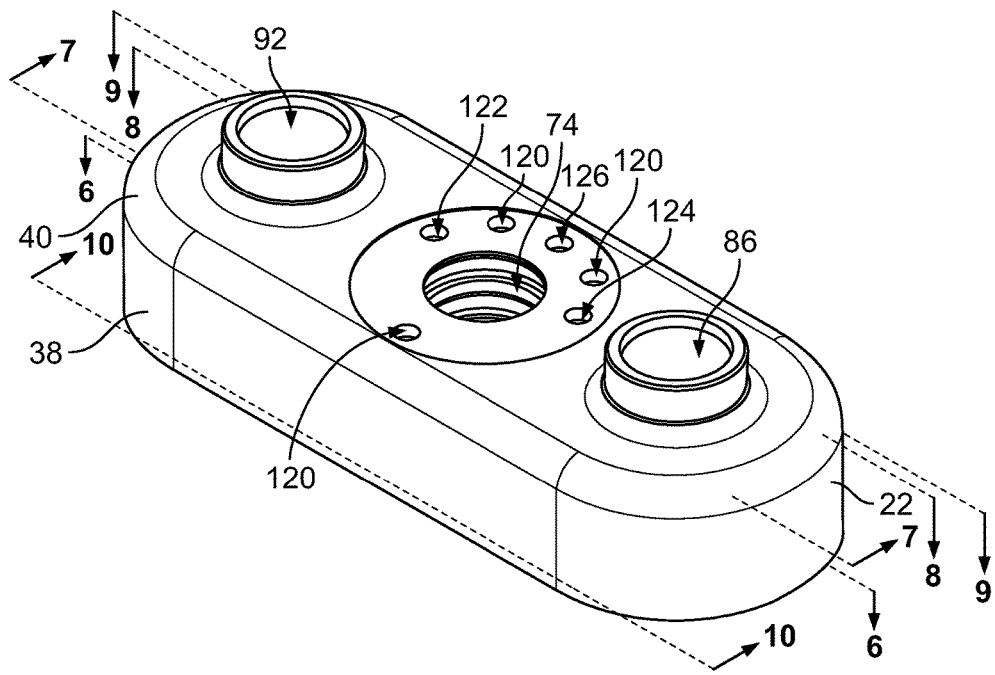
FIG. 4 is a top, front, right side view of a base of a faucet.

Turning now to FIG. 4, the body 22 is shown in greater detail. On its top side, the body 22 includes the upper cold water valve opening 86, the upper hot water valve opening 92, and the cartridge opening 74. Surrounding the cartridge opening 74 are three fastener openings 120. More or fewer fastener openings 120 may be included, depending on the number of fasteners 104 being used. Also surrounding the cartridge opening 74 is a mixed water inlet 122, a cold bypass outlet 124, and a mixed water outlet 126. The location of each of the mixed water inlet 122, the cold bypass outlet 124, and the mixed water outlet 126 is dependent on the configuration of the inner channels of the body 22 and these openings may be placed in different locations based on a different configuration of the inner channels.

Figure 5:
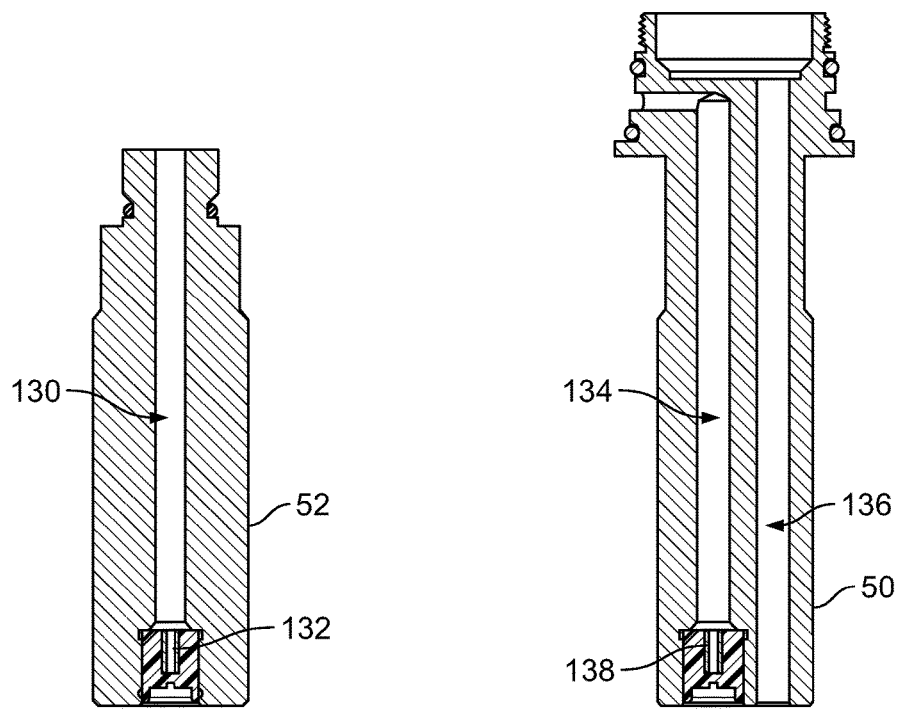
FIG. 5 is a front cross-sectional view of the hot and cold water shanks taken through line 5-5 of FIG. 1.

Referring now to FIG. 5, cross-sectional views of the cold water shank 50 and the hot water shank 52 are illustrated. Referring to the hot water shank 52, a hot water conduit 130 is disposed along an axis defining the hot water shank 52. A hot water check valve 132 is provided at a bottom end of the hot water shank 52, which operates to prevent water that has entered the faucet assembly 20 from leaving the faucet assembly 20. Referring now to the cold water shank 50, a cold water conduit 134 and a cold water bypass conduit 136 are provided within the cold water shank 50, which in combination, allow cold water to enter different portions of the faucet assembly 20 or enter the bypass conduit 136. A cold water check valve 138 is provided at a bottom end of the cold water conduit 134, which operates to prevent water that has entered the faucet assembly 20 from leaving the faucet assembly 20. More or fewer check valves 132, 138 may be provided depending on the desired configuration of the shanks 50, 52. As will be described in greater detail hereinafter below, hot water flows through the hot water conduit 130 and cold water flows through the cold water conduit 134 to separately arrive in the thermostatic mixing cartridge 80. Cold water also flows through the cold water bypass conduit 136, passes through the cold water valve 86, and arrives at the collar 28 of the faucet assembly 20, without mixing with any hot or tempered water.

Now referring to FIG. 6, a cold water shank opening 150 and a hot water shank opening 152 are illustrated. The cold water shank opening 150 is coaxial with the upper and lower cold water valve openings 86, 88. Also illustrated is a cold water conduit inlet 154, which is in fluid communication with a cold water chamber 156. Further, the hot water shank opening 152 is also shown and is in fluid communication with a hot water pre-mixing chamber 158. As shown more clearly in FIG. 5 and described below, the cold water conduit 134 is in selective fluid communication with the cold water chamber 156, and the hot water conduit 130 is in selective fluid communication with the hot water pre-mixing chamber 158.

A cold water bypass chamber 160 is also shown, which is in selective fluid communication with the cold water bypass conduit 136, depending on whether the cold handle 32 is in an open or closed configuration. The cold water chamber 156 is in fluid communication with a cold water inlet 162 of the thermostatic mixing chamber 60 and the hot water pre-mixing chamber 158 is in fluid communication with a hot water inlet 164 of the thermostatic mixing chamber 60. As will be described below, when the cold handle 32 is in an open configuration, cold water enters the cold water chamber 156, and when the hot handle 34 is in an open configuration, hot water enters the hot water pre-mixing chamber 158. The cold water bypass chamber 160 can be used to selectively place the cold water shank opening 150 in fluid communication with the cold bypass outlet 124, which extends out of the top of the body 22 in the proximity of the collar 28.

Figure 17:
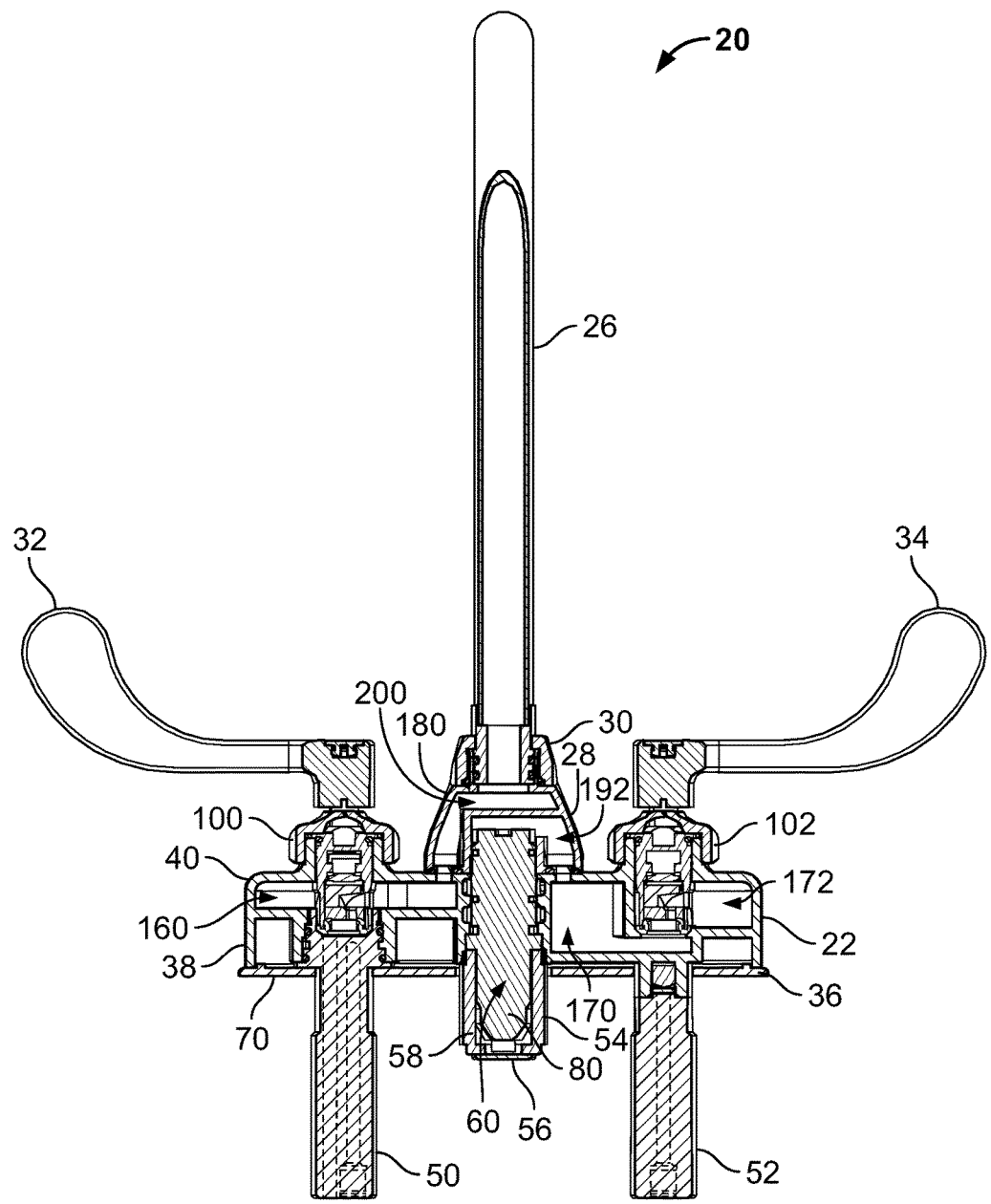
FIG. 17 is a rear cross-sectional view of a faucet assembly take through line 17-17 of FIG. 1.

With reference being made to FIGS. 7-13, the mixed water inlet 122 on the top of the body 22 (which is in fluid communication with a chamber mixed water passageway 192 via the collar 28 in the full assembly as depicted in FIG. 17) feeds into a mixed water pre-valve chamber 170 to place the mixed water inlet 122 in fluid communication with the lower hot water valve opening 94, which is coaxially situated with, and between the upper hot water valve opening 92 and the hot water shank opening 152. The lower hot water valve opening 94 is selectively opened or closed by the use of the hot water valve 90 to place the mixed water pre-valve chamber 170 in selective fluid communication with a mixed water passageway 172. The mixed water passageway 172 is in fluid communication with the mixed water outlet 126. The mixed water passageway 172 may have any number of configurations, which allows the mixed or tempered water that exits the thermostatic mixing cartridge 80 to ultimately arrive at the spout 24.

Turning now to FIGS. 11-14, the collar 28 is shown. The collar 28 includes a sloped outer surface 180, a planar nut surface 182, and a collar bottom 184. During operation of the faucet assembly 20, the planar nut surface 182 is in snug communication with the collar nut 30. In a preferred embodiment, the collar 28 further includes threading 186 which threadably engages the collar nut 30. However, the collar 28 and the collar nut 30 may be engaged in some other fashion, such as by a snap fit (for example), or the faucet assembly may not include a collar nut 30. The collar 28 may be adjoined to the stem 26 of the spout 24 without an intermediate member such as the collar nut 30.

Figure 12:
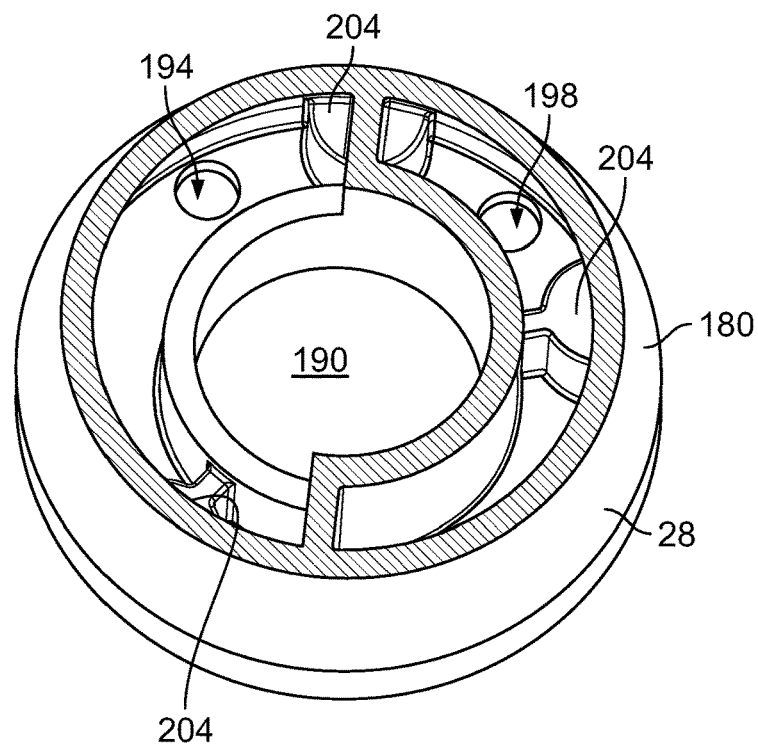
FIG. 12 is a top cross-sectional view taken through line 12-12 of the collar shown in FIG. 11.
Figure 13:
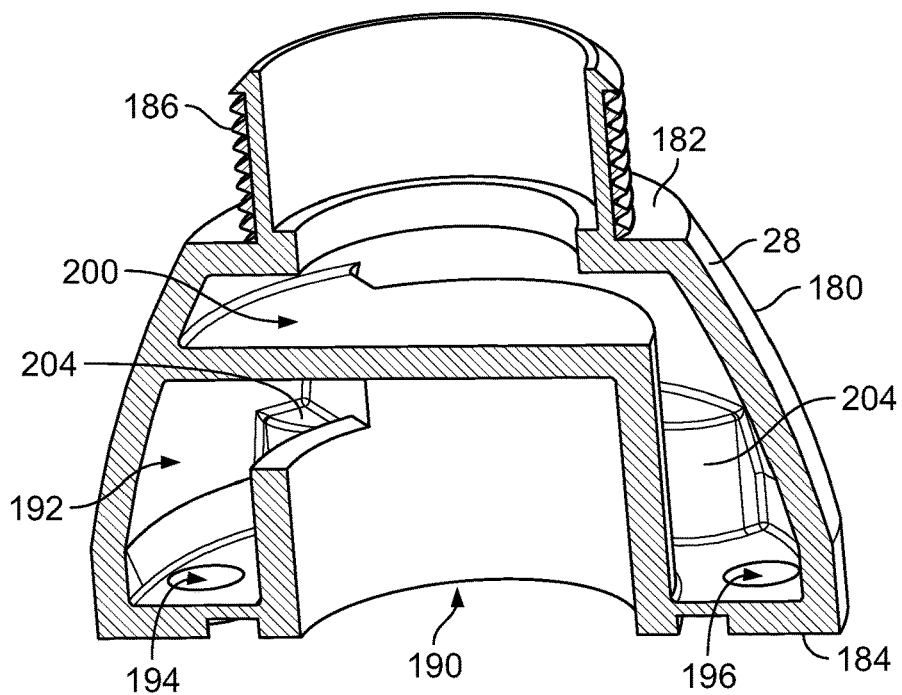
FIG. 13 is a side cross-sectional view taken through line 13-13 of the collar shown in FIG. 11.
Figure 14:
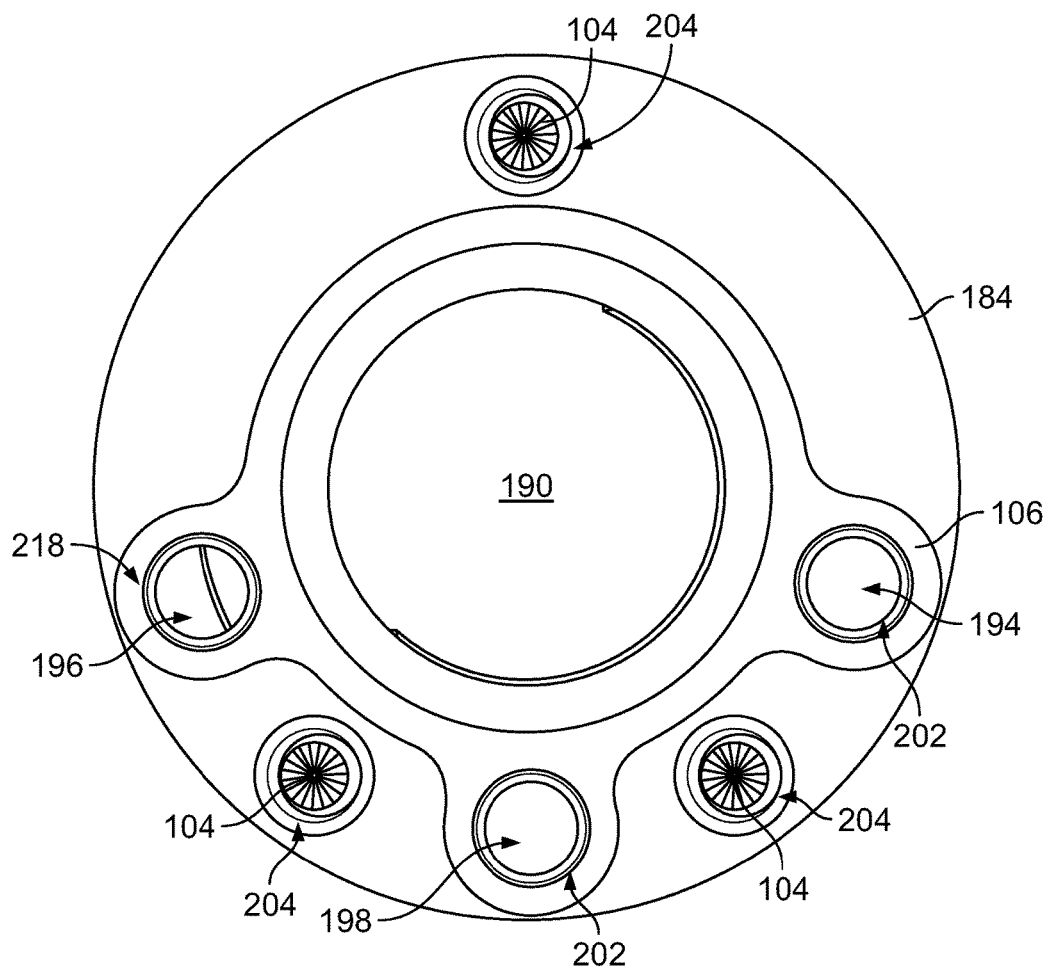
FIG. 14 is a bottom plan view of the collar of FIG. 11.

With continued reference to FIGS. 11-14, the collar 28 includes a plurality of inner collar channels which allow mixed water exiting the thermostatic mixing chamber 60 to flow through and out of the collar 28 and allow both mixed water and cold water entering the collar 28 through the cold bypass outlet 124 and the mixed water outlet 126 to mix and/or be provided to the spout 24. Referring specifically to FIGS. 12-14, the collar 28 includes a thermostatic outlet chamber 190, a mixed water passageway 192, and a mixed water outlet 194. The mixed water outlet 194 is in fluid communication with the mixed water inlet 122 of the body 22 and is further in fluid communication with the mixed water pre-valve chamber 170 of the body 22. Therefore, mixed water that exits the thermostatic mixing chamber 60 exits through the mixed water passageway 192, through the mixed water outlet 194, and through the mixed water inlet 122 into the mixed water pre-valve chamber 170 of the body 22.

As can be further seen in FIGS. 12-14, a collar cold bypass inlet 196 and a collar mixed water inlet 198 are disposed around the thermostatic outlet chamber 190. The collar cold bypass inlet 196 and the collar mixed water inlet 198 are in direct communication with the cold bypass outlet 124 and the mixed water outlet 126, respectively, to allow cold water and mixed water from the cold water bypass chamber 160 and the mixed water passageway 172, respectively, to enter the collar 28 and mix at the chamber at a juncture 200 before traveling to the stem 26 of the spout 24 via the upper outlet of the collar 28.

As one of ordinary skill in the art would readily appreciate, the collar 28 and the body 22 are not required to be separate parts, but rather could be one unified piece. The inner channels of the body 22 and the inner channels of the collar 28 need only be in fluid communication with one another and any reduction or increase in the material or parts used would not affect the functionality of such channels.

FIG. 14 shows a bottom plan view of the collar 28. The collar seal 106 is abutted to the collar bottom 184. The collar seal 106 includes collar seal inlets 202 and a collar seal outlet 218, which are coaxially aligned with the chamber mixed water outlet 194, the collar cold bypass inlet 196, and the collar mixed water inlet 198. Fastener receiving ports 204 are also shown in a triangular configuration along the collar bottom 184. There may be any number of fastener receiving ports 204 which operate to fasten the collar 28 to the body 22.

Figure 15:
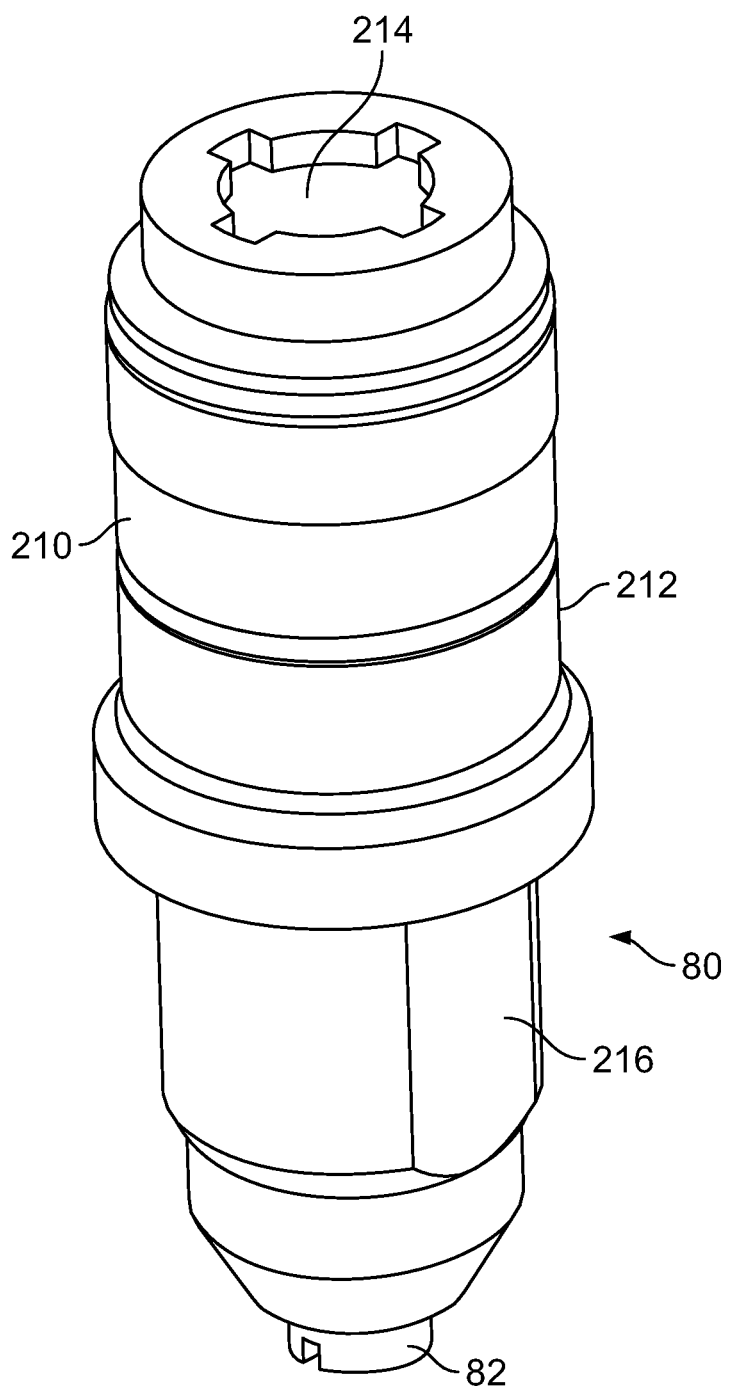
FIG. 15 is an isometric view of a thermostatic mixing cartridge.

Turning to FIG. 15, the thermostatic mixing cartridge 80 is shown having a thermostatic hot water inlet port 210 (which may be a mesh surface providing communication to an internal channel), a thermostatic cold water inlet port 212 (which may also be a mesh surface providing communication to another internal channel), a thermostatic mixed water outlet port 214, and a thermostatic element housing 216. During use, hot water and cold water enter the thermostatic hot water inlet port 210 and the thermostatic cold water inlet port 212, respectively, and tempered or mixed water exits the mixed water outlet port 214 having a temperature that does not exceed a predetermined threshold temperature. In the illustrated example, the thermostatic element housing 216 houses an expandable wax element that expands and contracts depending on the temperature of the hot water and cold water being received into the thermostatic mixing cartridge 80. As would be apparent to one of ordinary skill in the art, other thermostatic mixing cartridges could be used.

Figure 16:
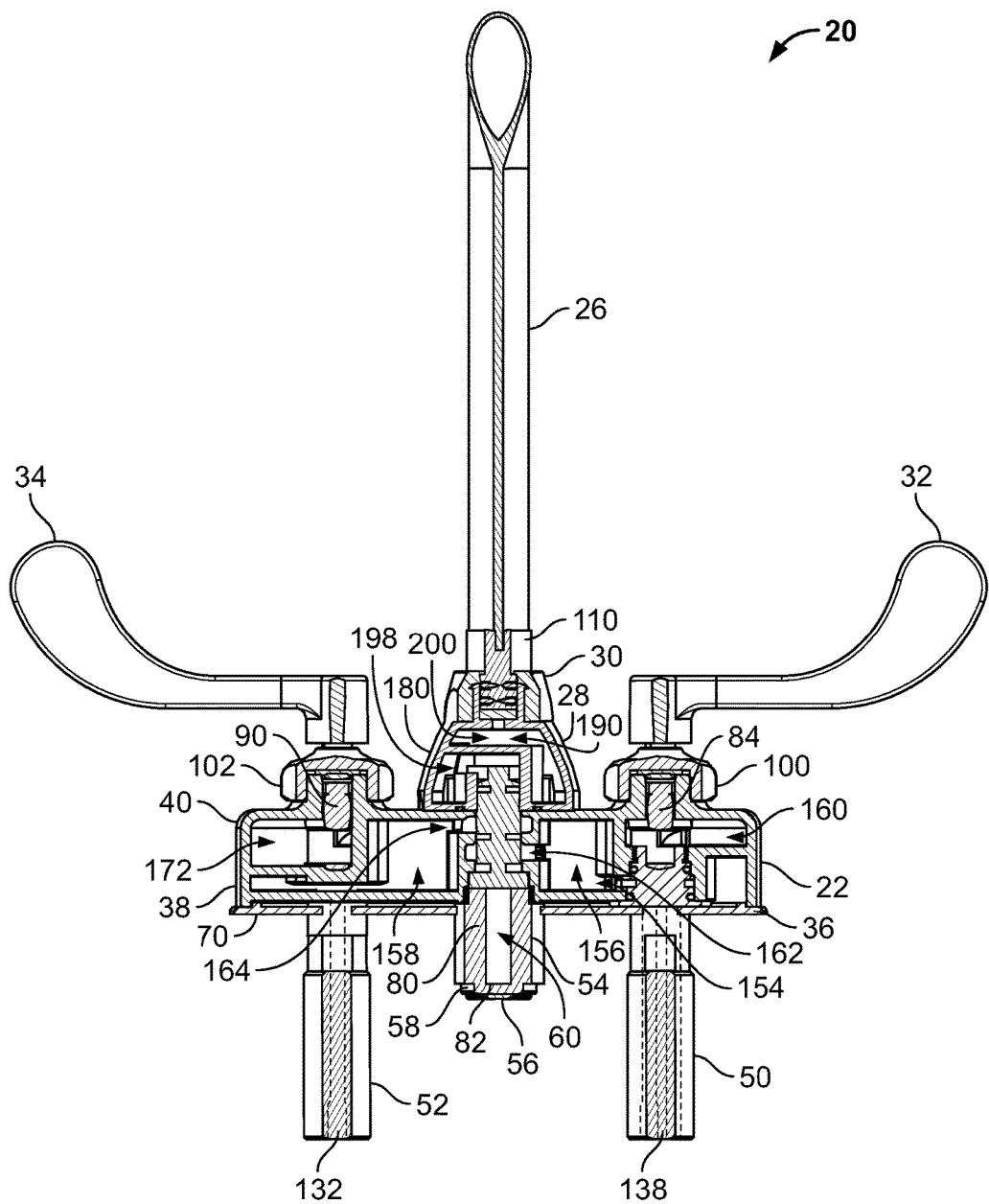
FIG. 16 is a front cross-sectional view of a faucet assembly taken through line 16-16 of FIG. 1.

FIG. 16 shows a front cross-sectional view of the body 22, the collar 28, the collar nut 30, the cold water shank 50, the hot water shank 52, and the entry end 110 of the stem 26. FIG. 17 shows a rear cross-sectional view of the body 22, the collar 28, the collar nut 30, the cold water shank 50, the hot water shank 52, and the entry end 110 of the stem 26.

With reference to FIGS. 16 and 17 in particular and all preceding figures, the flow of water through the faucet assembly 20 will now be further described. Water can flow from the cold water source and/or the hot water source through the cold water shank 50 and hot water shank 52 and then through the cold water valve 84 and hot water valve 90. While cold water may entirely bypass the thermostatic mixing cartridge 80 by passing through the cold water bypass chamber 160, all hot water supplied must first pass through the thermostatic mixing cartridge 80 prior to passing through the hot water valve 90 and be mixed with cold water as appropriate to obtain a desired tempered water temperature. After the cold water and/or tempered water passes through the cold water valve 84 and hot water valve 90 (if opened), respectively, the cold water and tempered or mixed water mixes in the collar 28 prior to being provided to the spout 24.

Notably, depending on the configuration of the valves, some, none, or all of the cold water can be routed either through the thermostatic mixing cartridge 80 and/or the cold water bypass chamber 160. After the cold water is provided at the cold water connection (e.g., the cold water shank 50) this cold water passes through the cold opening 76 into the cold water chamber 156.

When the cold water valve 84 is in the closed configuration, cold water may only enter into the cold water chamber 156 and flow into the thermostatic mixing cartridge 80. However, this flow of cold water into the thermostatic mixing cartridge 80 will only occur if the hot water valve 90 is open to induce flow of tempered water out from the thermostatic mixing cartridge 80, which also pulls in cold water via the cold water conduit 134 and cold water chamber 156 to temper the hot water. With the cold water valve 84 closed, cold water does not enter into the cold water bypass chamber 160 through the lower cold water valve opening 88 because the lower cold water valve opening 88 is sealed by the closure of the cold water valve 84. When the cold water valve 84 is in the open configuration, some or all of the cold water in the cold water chamber 156 may enter the cold water bypass chamber 160 through the cold opening 76.

Whether this is some or all of the cold water depends on the condition of the hot water valve 90, since if this valve is open, some fraction of the cold water may also be drawn into the thermostatic mixing cartridge.

When the cold water valve 84 and the hot water valve 90 are both in the open configuration (thereby opening both of the openings 88 and 94 to accommodate flow therethrough), the cold water is directed into both the cold water chamber 156 and the cold water bypass chamber 160. The percentages or amounts of cold water that enters each of the cold water chamber 156 and the cold water bypass chamber 160 is based on a number of factors including whether the hot water valve 90 is in the open configuration and by how much, the temperature setting of the thermostatic mixing cartridge 80, the upstream water pressure in each of the cold water chamber 156 and the cold water bypass chamber 160.

When the cold water valve 84 is opened and the hot water valve 90 is closed, the cold water may enter only into the cold water bypass chamber 160 and not into the cold water chamber 156 toward the thermostatic mixing cartridge 80.

While the flow of cold water in the base is relatively complex, the flow of hot water is more limited. Any hot water that enters the body 22 through the hot water shank 52 enters into the hot water pre-mixing chamber 158. The hot water remains in the hot water pre-mixing chamber 158 until the hot water valve 90 is in the open configuration, at which point the hot water goes from the hot water pre-mixing chamber 158 into the hot water inlet 164. After the hot water enters through the hot water inlet 164, the hot water is in fluid communication with the thermostatic mixing cartridge 80 and the thermostatic mixing chamber 60.

Regardless of whether the cold water valve 84 is opened, when the hot water valve 90 is in the open configuration, both hot water and cold water can enter through the hot water inlet 164 and the cold water inlet 162, respectively, into the thermostatic mixing chamber 60 where the thermostatic mixing cartridge 80 operates to mix the hot water and the cold water to a desired, pre-set temperature or a temperature within a range of pre-set temperatures. As noted above, the achieved temperature is dependent on the thermostatic mixing cartridge 80 used, as well as the settings prescribed by the installer or user of the faucet assembly 20. When the hot water valve 90 is in the open configuration, the mixed water exits the thermostatic mixing chamber 60, the mixed water flows into the mixed water pre-valve chamber 170 and further into the hot water valve 90 and then to the mixed water passageway 172.

Figure 18:
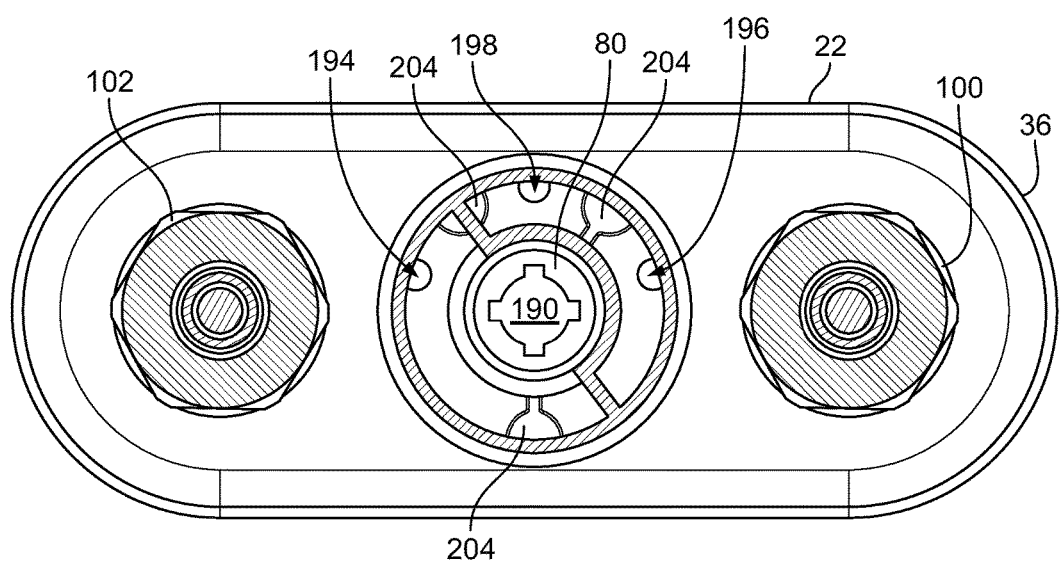
FIG. 18 is a top cross-sectional view of a faucet assembly taken through line 18-18 of FIG. 1.

As best understood with reference to FIGS. 16-18, any mixed water from the thermostatic mixing cartridge then travels out of the thermostatic mixing cartridge 80, into the thermostatic outlet chamber 190, through the chamber mixed water passageway 192 and the chamber mixed water outlet 194 to arrive at the mixed water pre-valve chamber 170. From the mixed water pre-valve chamber 170, the mixed water passes into the mixed water passageway 172 and toward the mixed water outlet 126 of the body.

Water from one or both of the mixed water passageway 172 and the cold water bypass chamber 160 then exit the body 22, enter the collar 28 where the flows may be mix (if more than one flow stream is present) and then are provided to the exit end 112 of the spout 24. In the case of tempered or mixed water from the mixed water passageway 172, mixed water flows from the mixed water passageway 172 into the mixed water outlet 126 of the body 22 and then enters the collar mixed water inlet 198. When the cold water valve 84 is in the open configuration, cold water flowing from the cold water bypass chamber 160 flows through the cold bypass outlet 124 and further through the collar cold bypass inlet 196 into the collar 28. In the collar 28, the tempered and/or cold water meet at the juncture 200 in which they can mix. The fully mixed water, or the single stream from either the mixed water passageway 172 or the cold water bypass chamber 160, then travels from the juncture 200 within the collar 28 up the stem 26 and out of the exit end 112 of the spout 24.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A faucet assembly comprising:
   a faucet body including a base and a spout supported by the base, in which the base includes a cold water connection and a hot water connection adapted for the reception of cold and hot water supplies, respectively, and in which the spout includes an outlet;
   a hot water flow control valve and a cold water flow control valve each supported by the base of the faucet body;
   a thermostatic mixing cartridge disposed in the base in which the thermostatic mixing cartridge has a hot water inlet that is in fluid communication with the hot water connection, a cold water inlet that is in fluid communication with the cold water connection, and a mixed water outlet;
   a mixed water passageway having walls defined by the base which places the mixed water outlet of the thermostatic mixing cartridge in selective fluid communication with the outlet of the spout when the hot water flow control valve is opened; and
   a cold water bypass passageway having walls defined by the base which places the cold water connection of the base in selective fluid communication with the outlet of the spout when the cold water flow control is opened;
   wherein, during use, a flow of mixed water from the thermostatic mixing cartridge is regulated by the hot water control valve into the spout, a flow of the cold water is regulated by the cold water control valve, and the flows of both the mixed water and the cold water are further mixed at a juncture of the mixed water passageway and the cold water bypass passageway prior to exiting the faucet assembly via the outlet of the spout.

2. The faucet assembly of claim 1, wherein the cold water bypass passageway that places the cold water connection of the base in selective fluid communication with the outlet of the spout when the cold water flow control valve is opened provides a cold water flow pathway from the cold water connection to the outlet of the spout that does not flow through the thermostatic mixing cartridge.

3. The faucet assembly of claim 1, further comprising a collar wherein the collar is mounted between the base and the spout.

4. The faucet assembly of claim 3, wherein the juncture of the cold water bypass passageway and the mixed water passageway is in an internal mixing chamber of the collar.

5. The faucet assembly of claim 4, wherein the internal mixing chamber of the collar is located intermediate the cold water bypass passageway and the mixed water passageway and the outlet of the spout.

6. The faucet assembly of claim 3, wherein the collar at least partially houses the thermostatic mixing cartridge and a set of openings between the collar and the base provide the mixed water outlet of the thermostatic mixing cartridge.

7. The faucet assembly of claim 1, wherein the thermostatic mixing cartridge is adjustable to control an amount of hot and cold water entering the thermostatic mixing cartridge via the hot water inlet and the cold water inlet, respectively, and to establish a temperature of mixed water exiting the mixed water outlet.

8. The faucet assembly of claim 7, wherein the thermostatic mixing cartridge is rotationally adjustable to control an amount of hot and cold water entering the thermostatic mixing cartridge via the hot water inlet and the cold water inlet.

9. The faucet assembly of claim 8, wherein the faucet assembly has walls at least partially surrounding the cartridge that are part of the base.

10. The faucet assembly of claim 9, wherein the walls at least partially surrounding the cartridge that are part of the base provide openings for the hot water inlet and the cold water inlet.

11. The faucet assembly of claim 9, wherein the faucet assembly further comprises a cartridge cap that is connected to a bottom of the base to retain the cartridge in place in which the retention cap includes an opening on an axial face thereof that permits adjustment of the cartridge.

12. The faucet assembly of claim 1, wherein the thermostatic mixing cartridge is integral with the faucet body.

13. The faucet assembly of claim 1, wherein the hot water inlet is in fluid communication with the hot water connection via a hot water passageway having walls defined by the base and wherein a cold water inlet is in fluid communication with the cold water connection via a cold water passageway having walls defined by the base.

14. The faucet assembly of claim 1, wherein the thermostatic mixing cartridge is centrally disposed between the hot water flow control valve and the cold water flow control valve.

15. The faucet assembly of claim 1, wherein the cold water connection and the hot water connection are tubular channels providing exterior threading for connection to cold and hot water supplies.

* * * * *